(12) United States Patent
Henry et al.

(10) Patent No.: US 12,524,824 B2
(45) Date of Patent: Jan. 13, 2026

(54) SYSTEM AND METHOD FOR INDOOR SPATIAL MAPPING

(71) Applicant: CONCEPT SAFETY SYSTEMS (HOLDINGS) PTY LTD., Loganholme (AU)

(72) Inventors: Matthew Henry, Loganholme (AU); Lucas Brown, Loganholme (AU); John Hummelstad, Loganholme (AU)

(73) Assignee: CONCEPT SAFETY SYSTEMS (HOLDINGS) PTY LTD., Loganholme (AU)

( * ) Notice: Subject to any disclaimer, the term of this patent is extended or adjusted under 35 U.S.C. 154(b) by 548 days.

(21) Appl. No.: 17/430,296

(22) PCT Filed: Feb. 12, 2020

(86) PCT No.: PCT/AU2020/050119
§ 371 (c)(1),
(2) Date: Aug. 11, 2021

(87) PCT Pub. No.: WO2020/163913
PCT Pub. Date: Aug. 20, 2020

(65) Prior Publication Data
US 2022/0092720 A1 Mar. 24, 2022

(30) Foreign Application Priority Data
Feb. 12, 2019 (AU) ................. 2019900449

(51) Int. Cl.
*G06V 20/70* (2022.01)
*G01C 21/20* (2006.01)
*G06F 16/2457* (2019.01)
*G06F 16/29* (2019.01)
*G06Q 90/00* (2006.01)
(Continued)

(52) U.S. Cl.
CPC ......... *G06Q 90/205* (2013.01); *G01C 21/206* (2013.01); *G06F 16/24575* (2019.01); *G06F 16/29* (2019.01); *G06T 7/521* (2017.01); *G06T 7/70* (2017.01); *G06V 10/255* (2022.01); *G06V 20/176* (2022.01); *G06V 20/36* (2022.01); *G06V 20/70* (2022.01)

(58) Field of Classification Search
None
See application file for complete search history.

(56) References Cited

U.S. PATENT DOCUMENTS 9,860,723 B2 * 1/2018 R ........................... H04W 4/90
10,137,984 B1 11/2018 Flick
(Continued)

FOREIGN PATENT DOCUMENTS

CA 3029048 A1 9/2019

*Primary Examiner* — Tsung Yin Tsai
(74) *Attorney, Agent, or Firm* — FULLER IP LAW LLC; Rodney J. Fuller

(57) ABSTRACT

A system and method for mapping indoor spaces including a mobile mapping device having a camera; a plan database configured to store 2-D floorplans; and a processor configured to integrate a selected floorplan from the plan database with object data received from the mobile mapping device to create a mountable evacuation sign of a venue. The processor is configured to recognise objects from an image from the camera and anchor the recognised object within a 2-D floorplan.

19 Claims, 4 Drawing Sheets

(51) Int. Cl.
    *G06T 7/521*     (2017.01)
    *G06T 7/70*     (2017.01)
    *G06V 10/20*     (2022.01)
    *G06V 20/00*     (2022.01)
    *G06V 20/10*     (2022.01)

(56) References Cited

U.S. PATENT DOCUMENTS

| | | | |
|---|---|---|---|
| 10,522,030 B2 * | 12/2019 | Taylor | G08B 25/016 |
| 10,775,959 B2 * | 9/2020 | Mildrew | G06T 17/05 |
| 10,810,845 B2 * | 10/2020 | Coles | G08B 13/19619 |
| 10,959,079 B2 * | 3/2021 | Klein | H04W 4/029 |
| 2011/0096091 A1 | 4/2011 | Milewski et al. | |
| 2013/0053063 A1 | 2/2013 | McSheffrey | |
| 2016/0049064 A1 * | 2/2016 | McNabb | G01C 21/206 |
| | | | 340/540 |
| 2018/0018502 A1 | 1/2018 | Rao et al. | |
| 2019/0050137 A1 * | 2/2019 | Mildrew | G06F 3/04815 |
| 2020/0050206 A1 * | 2/2020 | Deyle | G01S 13/876 |
| 2020/0315421 A1 * | 10/2020 | Kung | G08B 21/02 |
| 2021/0364296 A1 * | 11/2021 | Liu | G01C 21/206 |
| 2022/0092720 A1 * | 3/2022 | Henry | G06F 16/24575 |

* cited by examiner

SYSTEM AND METHOD FOR INDOOR SPATIAL MAPPING

CROSS-REFERENCE TO RELATED APPLICATIONS

This application is the U.S. National Stage of International Patent Application No. PCT/AU2020/050119, filed on Feb. 12, 2020, which claims the benefit of and priority to Australia Patent Application No. 2019900449, filed on Feb. 12, 2019, the contents of each of which are hereby incorporated by reference in their entireties.

FIELD OF THE INVENTION

The present disclosure relates to improvements in systems and methods for internal structure map creation and icon annotation.

BACKGROUND OF THE INVENTION

Conventional systems heavily rely on manual operations to prepare two-dimensional floorplans. Such methods are prone to error, time-consuming, and not easy to update when changes occur in a given floor environment. Further opportunities for errors exist due to the myriad of compliance regulations across various levels of government, which hamper the efficient creation of legally compliant plans and evacuation signs. The ability to produce a floorplan efficiently and relatively accurately would be of great benefit. Accordingly, there exists a need to provide an improved system and method which is less prone to the problems of conventional systems and methods.

SUMMARY

The present invention in one preferred aspect provides for a system for mapping indoor spaces. The system includes a mobile mapping device having a camera; a plan database configured to store 2-D floorplans; and a processor configured to integrate a selected floorplan from the plan database with object data received from the mobile mapping device to create a viewable evacuation sign of a venue that can be adjusted for aesthetic fine tuning. The processor is configured to recognise objects from an image from the camera and anchor the recognised object within a 2-D floorplan.

In another preferred aspect, the present invention provides a method creating a mountable evacuation sign. The method includes storing a 2-D floorplan in a floorplan database; digitally tagging reference points in a level of a structure, at least one of the digitally tagged reference points being a digitally recognised object; anchoring at least one tagged reference point to the 2-D floorplan; and generating a 2-D evacuation sign from the 2-D floorplan with the at least one anchored reference point.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers. It will be appreciated that reference herein to "preferred" or "preferably" is intended as exemplary only.

As used herein, "configured" includes creating, changing, or modifying a program on a computer or network of computers so that the computer or network of computers behave according to a set of instructions. The programming to accomplish the various embodiments described herein will be apparent to a person of ordinary skill in the art after reviewing the present specification, and for simplicity, is not detailed herein. The programming may be stored on a computer readable medium, such as, but not limited to, a non-transitory computer readable storage medium (for example, hard disk, RAM, ROM, CD-ROM, USB memory stick, or other physical device), and/or the Cloud.

The claims as filed and attached with this specification are hereby incorporated by reference into the text of the present description. The disclosure of Australian Provisional Application No. 2019900546, entitled "Emergency Services Platform and Method" is incorporated by reference herein.

The accompanying drawings, which are incorporated in and constitute a part of this specification, illustrate several embodiments of the invention and together with the description, serve to explain the principles of the invention.

DETAILED DESCRIPTION OF THE DRAWINGS

Reference will now be made in detail to the present preferred embodiments of the invention, examples of which are illustrated in the accompanying drawings.

Figure 1:
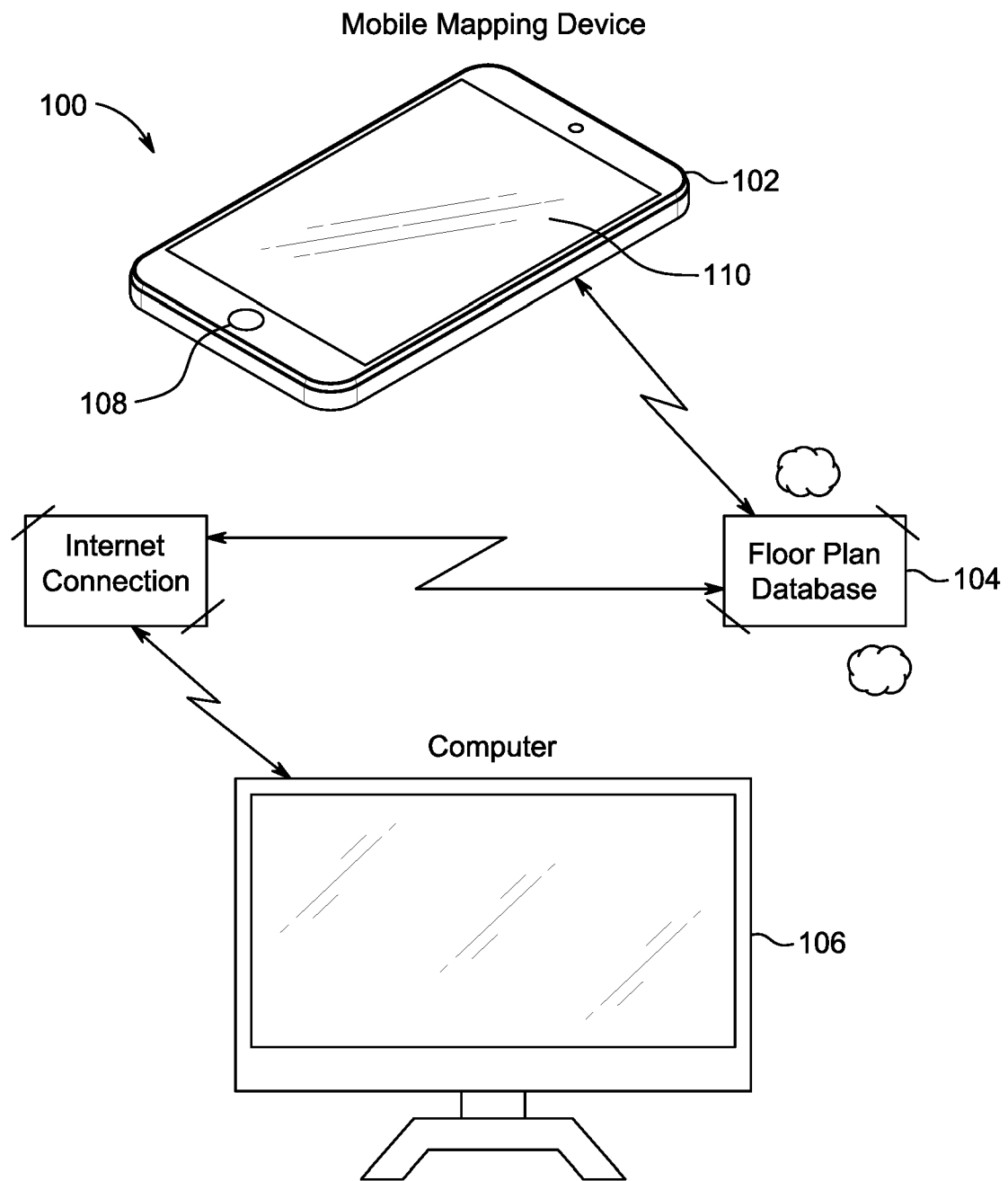
FIG. 1 is a system diagram of the components of the system in accordance with a preferred embodiment of the present invention.

FIG. 1 shows a preferred embodiment of a system 100 for indoor spatial mapping having a mobile mapping device 102, a floorplan database 104, and a computer processor 106. In use, a user surveys the interior of a floor of a building with mapping device 102. Data from the survey is immediately synchronized, or if there is no internet connectivity, cached first before being stored to database 104. Reference points and objects are tagged and anchored within the floorplan using processor 106, and stored as needed in database 104 as an enhanced floorplan. The tagging and anchoring helps to configure the floorplan as an enhanced floorplan. The anchoring may be accomplished by fixing the coordinates of an object or feature within a geospatial grid. The floorplan may be printed and posted as an evacuation sign. It will be appreciated that elements of the present disclosure are applicable for the generation of any arbitrary floor or building plans where spatial accuracy is required, and that an evacuation sign is but an example. The preferred elements of system 100 and their interrelationship are described below.

Referring to FIG. 1, mobile mapping device 102 preferably includes a user interface 108, display 110, a camera, and a wireless transceiver radio. Mapping device may be adapted for depth-detection and may include a laser and/or a 3-D rangefinder to facilitate depth detection. The details of depth detection would be appreciated by a person of ordinary skill in the art, and are omitted for simplicity. The wireless radio is preferably configured for Wi-Fi and/or peer-to-peer communications, such as Bluetooth, Wi-Fi Direct, and/or NFC. It will be appreciated that mapping device 102 may be configured for wired communication in addition to, or as an alternative to wireless communication.

In one or more embodiments, mapping device 102 may be a customised, purpose-built device for indoor spatial mapping, or a specially programmed smartphone, tablet, or other mobile computing device configured as desired to perform the spatial mapping functions described in one or more exemplary embodiments herein.

User interface 108 may be a touch pad or display keyboard, and/or interactable screen with an electronic stylus.

Floorplan database 104 is configured to store a plurality of digitised and enhanced floorplans. Database 104 may be configured as a physical server, a cloud server, a part of a distributed server network, and/or a portable memory, with or without wireless communications. The plan database may include more than just floorplans. For example, the plan database may include a variety of profiles and data, such as a list of clients, campuses, buildings, and/or floors.

Floor plan database 104 may store information on tagged reference points and structural aspects of the building including, but not limited to wall, floor, ceiling and window dimensions, dynamic characteristics, static properties, construction material, and data types allowing for advanced querying and retrieval of building information.

User interface 108 of mapping device 102, or processor 106 may also capture logical information such as one-way traffic flow, etc., which is also stored in database 104 as data capable of being queried.

Processor 106 may be in the form of a microcomputer such as a laptop computer. Processor 106 preferably includes a microchip, such as a System on Chip (SoC), with appropriate control circuitry.

Figure 2:
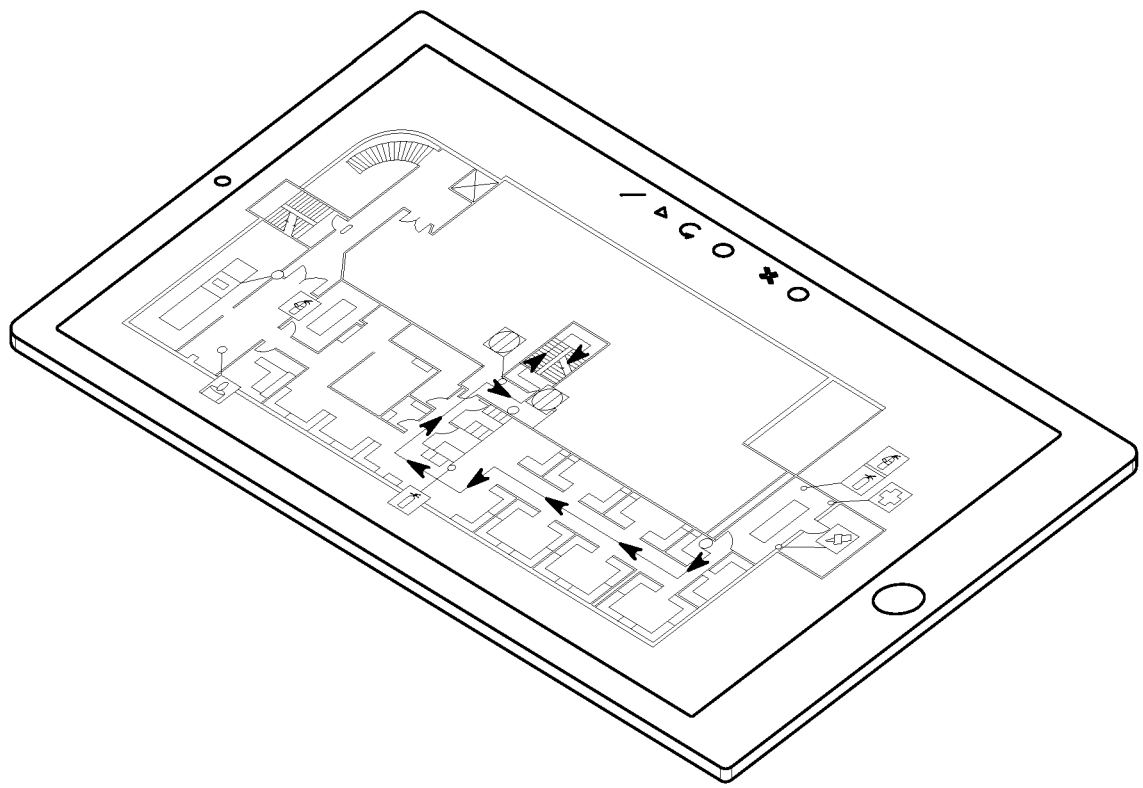
FIG. 2 is a perspective view of a floorplan created by the system of FIG. 1.
Figure 3:
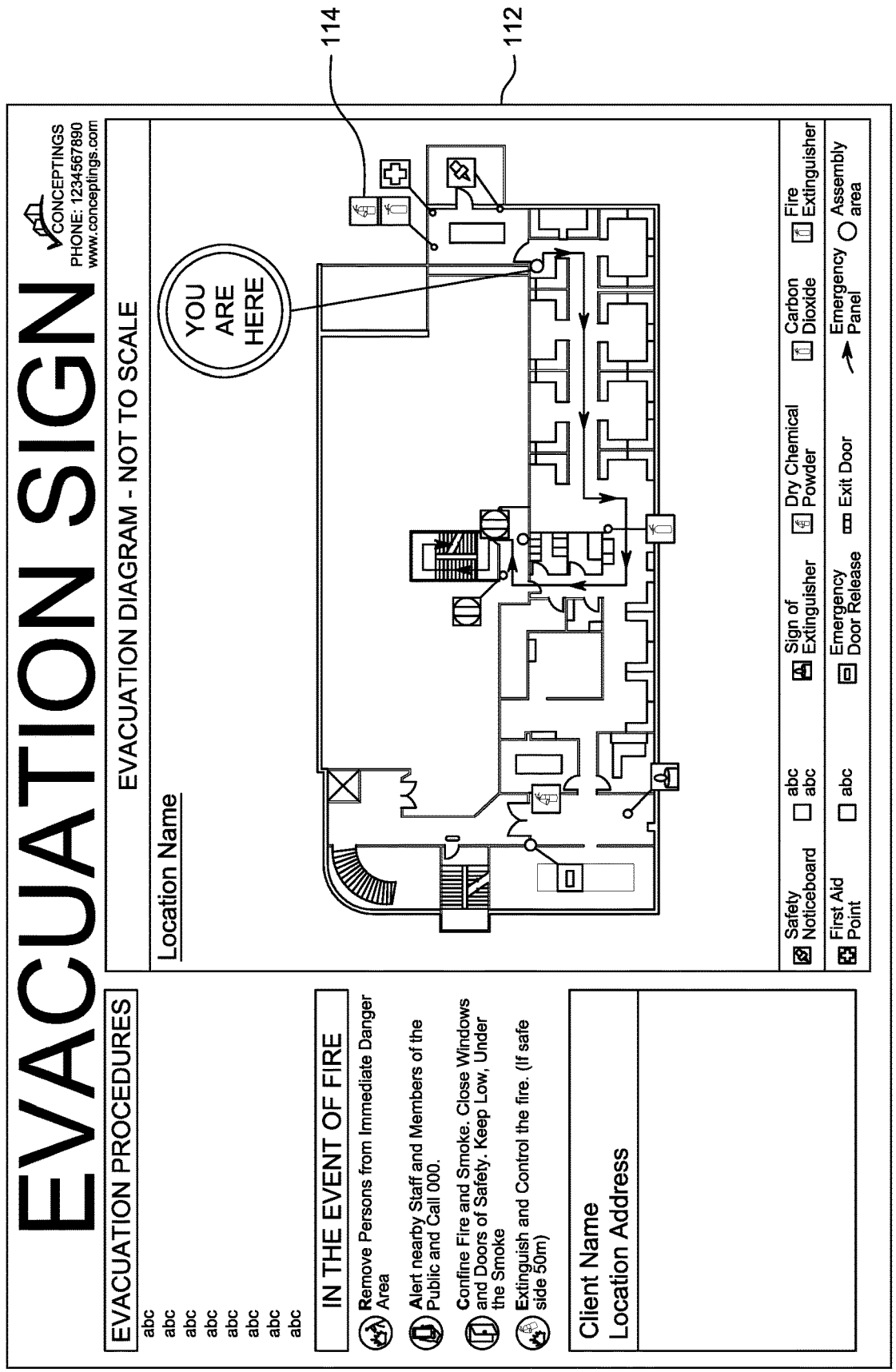
FIG. 3 is an evacuation sign created by the system of FIG. 1.
Figure 4:
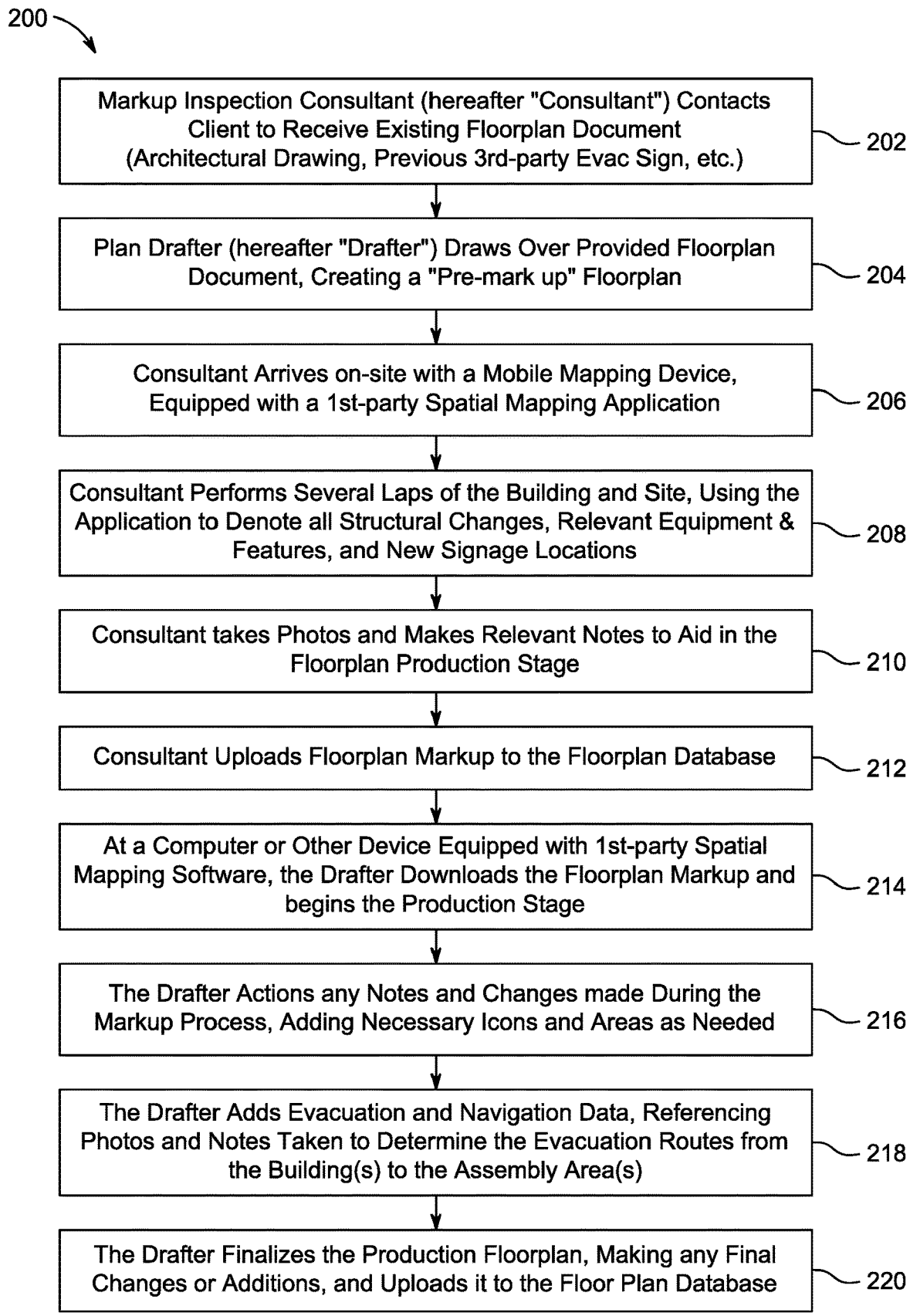
FIG. 4 is a flow diagram of a preferred method of preparing an indoor spatial mapping in accordance with a preferred embodiment of the present invention.

Having described the preferred components of system 100, a preferred method of use 200 will now be described with reference to FIGS. 2 to 4. Referring to FIG. 4, it is determined whether there is an existing floorplan for a floor of interest. If a floorplan already exists, then in step 202 the existing floorplan is provided. In step 204, the existing floorplan is annotated to create a "pre-mark up" floorplan. Next, in step 206, a user visits the floor that is the subject of the pre-existing floorplan. In step 208, the user conducts a survey of the floor utilising mapping device 102. Onsite updates (relative to the existing floorplan) are either noted for later processing, or changed immediately, along with types and locations of relevant equipment, and location of any existing signage, plus zone or area information that may be present such as male or female toilets. Photos of the surrounding area and any objects of interest are taken in step 210 with the camera of mapping device 102. Photos may be automatically placed using a combination of survey data, photo data, and through various methods of processing including machine learning and/or artificial intelligence. Data from the survey, including object location, identification and images, are uploaded to database 104. In step 212, the system automatically uploads the mark-up floorplan to database 104.

Once all the desired data is obtained, the enhanced floorplan is created. FIG. 2 shows an example of an enhanced floor plan created by system 100. Although illustrated as a document, it will be appreciated that the floorplan can be immediately viewable using mapping device 102 (FIG. 1). In step 214, the mark-up floorplan is downloaded to a local workstation. The mark-up floorplan is modified by incorporating object data and updates from the survey in step 216. In step 218, evacuation routes are determined, and the evacuation routes and navigational data is incorporated into the mark-up floorplan. Thereafter, in step 220, the enhanced floorplan is completed with any additional changes per notes obtained from the onsite survey, and the completed floorplan is uploaded to floorplan database 104. Once the enhanced floorplan is uploaded to database 104, an evacuation sign 112 (FIG. 3), or other type of compliant diagram, with similar and/or different sets of compliance rules, may be prepared and mounted in an appropriate location in the building that was subject to the onsite survey.

It will be appreciated that the steps described above may be performed in a different order, varied, or one or more steps omitted entirely without departing from the scope of the present invention. For example only, a preliminary mark-up need not be done. An existing floorplan may be modified only after the onsite survey is completed if desired.

A floorplan may not exist for a floor for any of many reasons. In another embodiment, mapping device may be configured to create an entirely new floorplan. For example, mapping device 102 may be configured to scan the interior space, determine the location of key reference points such as entryways, windows, stairs, furniture, and emergency equipment using depth detection and optionally, image recognition. The reference points are tagged and objects are classified. Each tag may contain coordinate data which may be geographical and/or local (relative to other reference points). When geographical coordinates are utilised, a geotag may be created to denote a reference point.

Data from the mapping device may then be used to assemble an enhanced floorplan with proper scaling based on tagged reference points. Object symbols may be anchored to the floorplan at correct locations based on the scan, tagging, and image recognition. With image recognition, an object image may be recognised and converted to a symbol representing the object. For example, an image of a fire extinguisher may be recognised through image recognition, tagged and anchored to the enhanced floorplan as a fire extinguisher symbol 114 (FIG. 3) at the correct location noted during the survey. The details of image recognition technology would be appreciated by those in the field, and for simplicity, are not repeated herein.

In addition to identifying key reference points data from mapping device 102, interior space scanning can be used to automatically generate a spatially accurate enhanced floorplan from structural and other significant features within the room such as wall intersections, window corners, doorway corners, and furniture edges identified from stereoscopic/multiple images taken using the camera of mapping device 102.

It is to be understood that the creation of a spatially accurate enhanced floorplan is achieved through either or both real time or post-processing of passive camera imagery that has the ability to infer depth of significant features in the imagery.

Processor 106 is preferably configured and specially programmed to combine the reference points (location data), object data (e.g., items of emergency equipment), and any existing floorplan data, and generate an enhanced floorplan with appropriately scaled entries and emergency equipment noted thereon. Once the reference points and objects are incorporated into the enhanced floorplan, processor 106 may be configured to determine an appropriate evacuation route. The evacuation route may be determined based on the location of the closest exit. Once determined, the evacuation route may be added to the enhanced floorplan. A regulation check may be conducted by digitally comparing the enhanced floorplan against regulatory standards applicable to the location of the building. The regulation data may be stored in a regulatory data database in communication with processor 106. The enhanced floorplan with evacuation route may be printed in a suitable form for mounting as required.

In situations where a prior floorplan needs updating, or a new one prepared with some manual assistance, either mapping device 102 or processor 106 may be configured to provide a manual assistance mode. For example only, based on intersections of a collection of user-drawn single line strokes, processor 106 may extrapolate and render seamless floorplan walls. The ability to predict and extrapolate walls on a floorplan may be based on a machine learning algorithm configured to identify a line having a minimum length, project an intersection of the line with another line or symbol, and complete the line to the proposed intersection without human intervention. Over repeated iterations of similar situations, the algorithm may be configured to recognise patterns with greater accuracy, and reduce human involvement needed to prepare floorplan updates or modifications.

The foregoing description is by way of example only, and may be varied considerably without departing from the scope of the present invention. For example, mapping device may be configured without a display. Data may be obtained through built-in scanning technology and image capture. Voice recognition may be incorporated as user interface.

When a 2-D floor plan is digitally stored in an enhanced form (e.g., containing tagged and/or anchored reference points, etc.), it may be possible to query the plan database for detail of any of the structural and content features of a floor (or floors) of the building. For example only, such queries may include a request for all floorplans of one or more structures located within a predetermined radius or distance of a geographical coordinate or map point, or a query for data regarding a building having a particular number of floors (e.g., 4 floors), or a query for a floor or building having a particular component made of a building material (e.g., internal glass dividing walls), or a query for a floor or building where a particular feature is absent (e.g., lacking a fire hose reel for instance). It will be appreciated that numerous kinds of inquiries may be generated once the database includes the data.

Features of the present disclosure may be used for outdoor venues, for example only, amphitheaters, botanical gardens, nature parks, amusement parks, etc.

The features described with respect to one embodiment may be applied to other embodiments, or combined with or interchanged with the features of other embodiments, as appropriate, without departing from the scope of the present invention.

The present invention in a preferred form provides the advantages of more accurate indoor mapping, more efficient mapping through the combination of devices and features, and an improved and safer determination of an evacuation route (when used for evacuation signs). For example only, signs are able to be produced with relative ease with the addition of any new safety features (fire extinguishers or hose reels), or new structural configurations or changes due to renovations. The efficiencies disclosed above permit personnel to allocate their time to other activities, and minimise potential errors. The reduction of mapping errors is quite important since emergency personnel might rely on structural maps during an emergency, and accurate data is paramount in such situations.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for mapping indoor spaces, comprising:
a mobile mapping device including a camera;
a plan database configured to store 2-D floorplans; and
a processor configured to integrate a selected floorplan from said plan database with object data received from said mobile mapping device to create a mountable evacuation sign of a venue, said processor being configured to recognize an object from an image from said camera and anchor the recognized object within a 2-D floorplan by fixing the coordinates of the object within a geospatial grid, wherein the floorplan being integrated with the object data is created with said mapping device.

2. The system of claim 1, wherein the object data includes an item of emergency equipment.

3. The system of claim 2, wherein the emergency equipment includes at least one of a fire extinguisher and a hose reel.

4. The system of claim 1, wherein said mobile mapping device is configured to tag predetermine objects for anchoring within a 2-D floorplan.

5. The system of claim 1, wherein said mobile mapping device is configured for depth detection.

6. The system of claim 1, wherein said mobile mapping device includes a depth detection laser emitter.

7. The system of claim 1, wherein said mobile mapping device is a tablet.

8. The system of claim 1, wherein the floorplan being integrated with the object data is a scanned digital copy of a printed floorplan.

9. A system for mapping indoor spaces, comprising:
a mobile mapping device including a camera;
a plan database configured to store 2-D floorplans; and
a processor configured to integrate a selected floorplan from said plan database with object data received from said mobile mapping device to create a mountable evacuation sign of a venue, said processor being configured to recognize objects from an image from said camera and anchor the recognised object within a 2-D floorplan using a digital tag including coordinate data, wherein said mapping device includes image recognition technology configured to recognise items of emergency equipment, said processor being configured to convert an image of the item of emergency equipment to a symbol for inclusion on the evacuation sign.

10. The system of claim 9, wherein said evacuation sign is a printed evacuation sign for mounting.

11. The system of claim 9, wherein said processor is configured to anchor the recognized object within a 2-D floorplan by fixing the coordinates of the object within a geospatial grid.

12. The system of claim 9, wherein the object data includes an item of emergency equipment.

13. The system of claim 12, wherein the emergency equipment includes at least one of a fire extinguisher and a hose reel.

14. The system of claim 9, wherein said mobile mapping device is configured to tag predetermine objects for anchoring within a 2-D floorplan.

15. The system of claim 9, wherein said mobile mapping device is configured for depth detection.

16. The system of claim 9, wherein said mobile mapping device includes a depth detection laser emitter.

17. The system of claim 9, wherein said mobile mapping device is a tablet.

18. The system of claim 9, wherein the floorplan being integrated with the object data is a scanned digital copy of a printed floorplan.

19. The system of claim 9, wherein the floorplan being integrated with the object data is created with said mapping device.

* * * * *